(12) United States Patent
Kesler et al.

(10) Patent No.: US 9,261,194 B2
(45) Date of Patent: Feb. 16, 2016

(54) METAL SEAL FITTING CONSTRAINTS

(75) Inventors: Eric William Kesler, Northville, MI (US); Fred Georg Schroeder, Grosse Ile, MI (US)

(73) Assignee: Hanon Systems, Daejeon-si (KR)

( * ) Notice: Subject to any disclaimer, the term of this patent is extended or adjusted under 35 U.S.C. 154(b) by 1572 days.

(21) Appl. No.: 12/714,821

(22) Filed: Mar. 1, 2010

(65) Prior Publication Data
US 2011/0210545 A1 Sep. 1, 2011

(51) Int. Cl.
| F16L 23/032 | (2006.01) |
| F16J 15/06 | (2006.01) |
| F16J 15/12 | (2006.01) |
| F16L 41/08 | (2006.01) |

(52) U.S. Cl.
CPC .............. *F16J 15/061* (2013.01); *F16J 15/062* (2013.01); *F16J 15/122* (2013.01); *F16L 23/032* (2013.01); *F16L 41/086* (2013.01)

(58) Field of Classification Search
USPC ........ 285/124.2–124.3, 142.1, 205, 328, 330, 285/336, 349, 378, 124.5; 277/602, 608, 277/626–627
See application file for complete search history.

(56) References Cited

U.S. PATENT DOCUMENTS

| 3,078,110 A | 2/1963 | Starr |
| 3,215,166 A | 11/1965 | Erich Meinecki |
| 3,367,682 A | 2/1968 | Meriano |
| 4,119,335 A | 10/1978 | Rieffle et al. |
| 4,225,161 A | 9/1980 | Smith |
| 4,361,331 A | 11/1982 | Kohler |
| 4,779,903 A | 10/1988 | Maier et al. |
| 4,842,287 A | 6/1989 | Weeks |
| 5,145,219 A | 9/1992 | Babuder |
| 5,727,304 A | 3/1998 | Eybergen |
| 5,803,507 A | 9/1998 | Vu |
| 6,328,351 B1 | 12/2001 | Kato et al. |
| 6,386,593 B1 | 5/2002 | Slais et al. |
| 6,676,167 B2 | 1/2004 | Schroeder et al. |
| 6,834,893 B2 * | 12/2004 | Schroeder et al. ............ 285/368 |
| 6,857,638 B2 | 2/2005 | Dupont et al. |
| 6,869,107 B2 | 3/2005 | Schroeder et al. |
| 6,893,052 B2 | 5/2005 | Wildermuth et al. |
| 6,896,298 B2 | 5/2005 | Walterscheid et al. |
| 6,908,117 B1 | 6/2005 | Pickett, Jr. et al. |
| 6,969,094 B2 | 11/2005 | Frohling et al. |
| 7,621,568 B2 * | 11/2009 | Schroeder et al. ............ 285/336 |
| 2003/0080554 A1 | 5/2003 | Schroeder et al. |
| 2004/0178631 A1 | 9/2004 | Frohling et al. |
| 2005/0023828 A1 | 2/2005 | Takeuchi et al. |
| 2005/0184513 A1 | 8/2005 | Chisnell |
| 2007/0273102 A1 * | 11/2007 | Schroeder et al. ............ 277/312 |

FOREIGN PATENT DOCUMENTS

DE 102007035222 A1 1/2009

* cited by examiner

*Primary Examiner* — Aaron Dunwoody
*Assistant Examiner* — Fannie Kee
(74) *Attorney, Agent, or Firm* — Fraser Clemens Martin & Miller LLC; James D. Miller (57) ABSTRACT

An air conditioner system fitting includes a first seal portion comprising a metal material adapted to provide a primary seal, and a second seal portion attached to a free edge of the first seal portion and adapted to provide a secondary seal, wherein the fitting militates against leakage during operation of the air conditioning system.

17 Claims, 8 Drawing Sheets

METAL SEAL FITTING CONSTRAINTS

FIELD OF THE INVENTION

The invention relates to a fitting for a vehicle air condition system and more particularly to a fitting for coupling tubing segments, the fitting including a seal structure having a first seal portion and a second seal portion.

BACKGROUND OF THE INVENTION

In assembly line manufacturing of vehicles, it is desirable that line fittings in an air conditioning system can be secured using a power nut driver rather than using a torque wrench. For this reason, peanut or block type fittings are often used.

Various refrigerants such as R12, R134a, and $CO_2$ have been used in the air conditioning system for the vehicle. However, environmental concerns exist. As a result, legislation has been passed by various governmental agencies of the United States and the European Union, for example, requiring that the air conditioning system operate with substantially no refrigerant leaks or permeation.

Seal structures having multiple seals have been used to militate against leaks from the fittings used in the air conditioning system. These prior art seal structures have included rubber O-rings and other elastomeric seals, for example. However, over time, such seals can degrade. Damage to the seal structure can also occur due to improper installation or handling.

An advantageous prior art block fitting with seal structure is described in Assignee's U.S. Pat. No. 7,621,568 to Schroeder et al., the entire disclosure of which is hereby incorporated herein by reference. The block fitting includes a male block portion with a first aperture receiving a tube end therein. The male block portion includes an annular shoulder surrounding the first aperture of the male block portion. The annular shoulder has an axially extending lip formed at a first end thereof. The block fitting also includes a female block portion with a first aperture receiving a tube end therein or a female integrated into a mating component. The female block portion has an annular collar surrounding the first aperture of the female block portion and cooperating with the annular shoulder formed by the male block portion. The first aperture of the male block portion and the first aperture of the female block portion are substantially concentrically aligned.

As further described in Schroeder et al., a seal structure is disposed radially inward from the axially extending lip of the male block portion and between the male block portion and the female block portion. The seal structure includes a first seal portion produced from a plastically deformable (e.g., soft) metal or plastic material, and has a free edge. The first seal portion surrounds the first aperture of the male block portion and the first aperture of the female block portion. A second seal portion is produced from an elastomer disposed on the free edge of the first seal portion. A fastener sealingly engages the male block portion and the female block portion. The fastener causes the male block portion and the female block portion to deform the first seal portion and thereby provide a primary seal between the male block portion and the female block portion. The fastener also causes the male block portion and the female block portion to cooperate with the second seal portion and provide a secondary seal between the male block portion and the female block portion. The primary seal and the secondary seal militate against a leakage of a fluid from the block fitting.

There is a continuing need for a fitting including a seal structure for use in an air conditioning system which minimizes a leaking of a refrigerant from the air conditioning system. Desirably, critical design constraints of the fitting and seal structure are optimized in order to minimize the leaking of the refrigerant from the air conditioning system.

SUMMARY OF THE INVENTION

In concordance with the instant disclosure, a fitting including a seal structure for use in an air conditioning system, in which the critical design constraints have been optimized to minimize a leaking of a refrigerant from the air conditioning system, has surprisingly been discovered.

In one embodiment, a block fitting for an air conditioning system includes a male block portion having a first aperture receiving a tube end therein. The male block portion includes an annular shoulder surrounding the first aperture of the male block portion. The annular shoulder has an axially extending lip formed at a first end thereof. The blocking fitting also includes a female block portion having a first aperture receiving a tube end therein. The female block portion includes an annular collar surrounding the first aperture of the female block portion. The annular collar cooperates with the annular shoulder formed by the male block portion. The first aperture of the male block portion and the first aperture of the female block portion are substantially concentrically aligned. The female block portion has an annular groove between the aperture and the annular collar. The annular groove cooperates with the axially extending lip of the male block portion. The block fitting has a seal structure disposed radially inward from the axially extending lip of the male block portion. The seal structure is further disposed between the male block portion and the female block portion. The seal structure has a first seal portion produced from a deformable metal or plastic material. The seal structure also has a free edge. The first seal portion surrounds the first aperture of the male block portion and the first aperture of the female block portion. The seal structure also has a second seal portion produced from an elastomer that is disposed on the free edge of the first seal portion. A fastener engages the male block portion and the female block portion. The fastener causes the male block portion and the female block portion to deform the first seal portion and provide a primary seal between the male block portion and the female block portion. The fastener also causes the male block portion and the female block portion to cooperate with the second seal portion to provide a secondary seal between the male block portion and the female block portion. The primary seal and the secondary seal militate against a leakage of a fluid from the block fitting. Each of the pair of tube ends and the male and female block portions have opposing sealing beads that deform the first seal portion and provide the primary seal between the male block portion and the female block portion. The sealing beads facilitate the formation of the primary seal regardless of the presence of contamination at the seal structure.

In another embodiment, the block fitting includes a coarse pilot that is formed by a coarse gap between the axially extending lip and an inner surface of the annular collar. A fine pilot is formed by a fine gap between the axially extending lip and a surface of the annular groove disposed opposite the inner surface of the annular collar. The fine gap forming the fine pilot is less than the coarse gap forming the coarse pilot, and militates against an extrusion of the second seal portion therethrough during the engagement of the male block portion and the female block portion.

In a further embodiment, the axially extending lip of the male block fitting and the inner surface of the annular collar of the female fitting are tapered to militate against a binding of the male block portion and the female block portion during an assembly of the block fitting.

DRAWINGS

The above, as well as other advantages of the present invention, will become readily apparent to those skilled in the art from the following detailed description of a preferred embodiment when considered in the light of the accompanying drawings in which.

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the order of the steps presented is exemplary in nature, and thus, is not necessary or critical.

Figure 1:
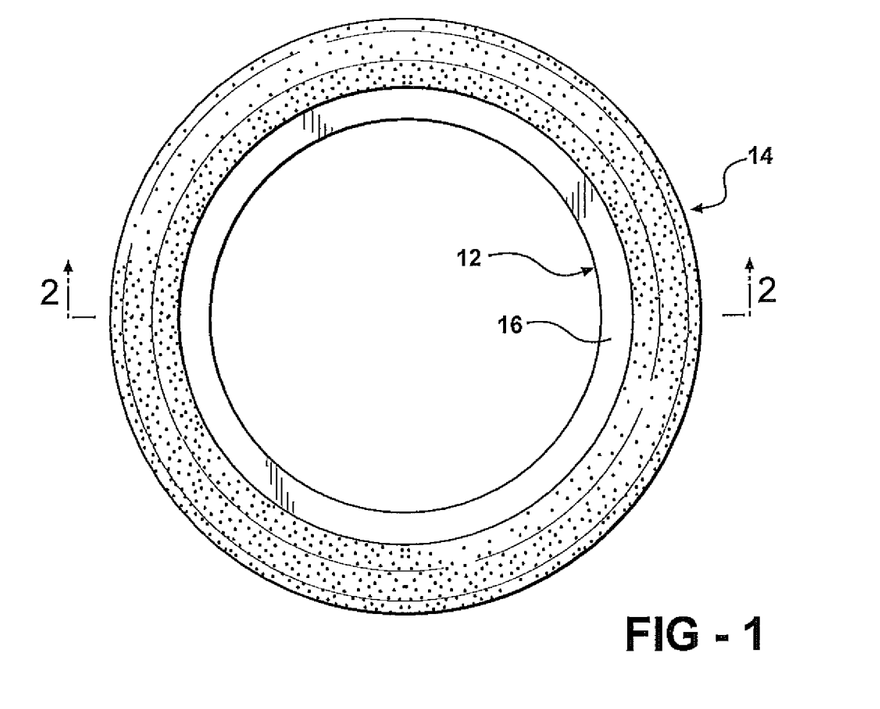
FIG. 1 is a top plan view of a seal structure according to an embodiment of the invention.

FIG. 1 shows a seal structure 10 according to an embodiment of the invention. Although the embodiment shown and described is used for a block type fitting for an air conditioning system, it is understood that the seal structure 10 can be used with other fitting types as desired.

Figure 2:
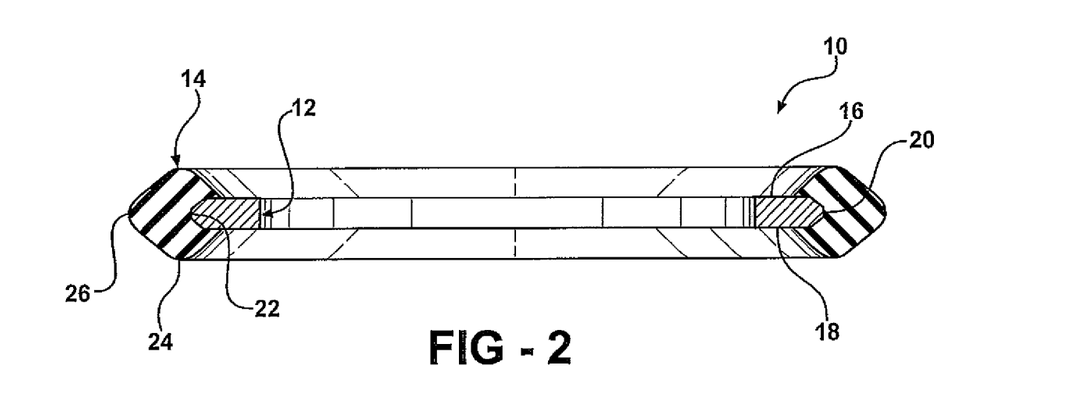
FIG. 2 is a cross-sectional view of the seal structure of FIG. 1 taken along section line 2-2.

The seal structure 10 includes a first seal portion 12 and a second seal portion 14. The first seal portion 12 is a substantially flat annular ring. As illustrated in FIG. 2, the ring has a first surface 16 and a second surface 18. An outer free edge 20 of the first seal portion 12 has a chamfer formed thereon. The chamfer provides additional surface area for bonding between the first seal portion 12 and the second seal portion 14 of the seal structure 10. The chamfer also permits the first seal portion 12 to be disposed further inside of the second seal portion 14 without displacing an undesirable amount of the material forming the second seal portion 14 for purposes of compression. The chamfer also provides a blunt end to the outer free edge 20 that minimizes stresses and cracking that would otherwise result if the outer free edge 20 terminated at a point and the seal structure 10 were compressed radially inward during assembly in the block fitting of the present disclosure.

It is understood that the outer free edge 20 can be any shape such as substantially square or rounded, for example. It is further understood that the outer free edge 20 can be continuous or scalloped to facilitate retention of the second seal portion 14 on the first seal portion 12. The cross-sectional shape of the first seal portion 12 is substantially rectangular, although other cross-sectional shapes can be used as desired such as triangular, oval, and other radial curves, for example. It is also understood that channels or grooves can be formed in the first surface 16 and the second surface 18 of the first seal portion 12. In the embodiment shown, the first seal portion 12 is produced from a tin-coated copper that has been annealed in a non-hydrogen containing inert gas prior to plating with tin in order to avoid embrittlement. However, it is understood that other conventional materials can be used as desired such as laminated tetrafluoroethylene, rubber-coated aluminum, PEEK, Vespel® high performance polyimide polymer, pewter, babbit, bronze, nickel, polyamide, aluminum, and other metal coated or rubber-coated metals, for example.

In a particular embodiment, the first seal portion 12 is formed from a soft deformable material having a hardness of less than about 40 HR 15T, where "H" stands for hardness, and "R" stands for the Rockwell Hardness and Rockwell Superficial Hardness Test Methods for Metallic Materials as specified in ASTM E 18. The hardness designation code "15T" is a superficial hardness scale which uses a 15 kg load and a 1/16" diameter hardened steel ball for indentation of a test sample. Typical washer materials such as hardened steel and hardened aluminum have hardness values greater than 40 HR15T, and are therefore not considered in the art to be "soft" materials. One of ordinary skill in the art should understand that materials having a hardness greater than 40 HR15T are not suitable for use in the seal structure 10 of the invention, which is instead configured to be plastically deformed upon installation of the seal structure 10 under a force, for example, from about 500 lbf/inch to about 1000 lbf/inch of sealing bead circumference, which is applied to sealingly engage the seal structure 10 with the block fitting for the mobile air conditioning system of the present disclosure.

The second seal portion 14 extends radially outwardly from the outer free edge 20 of the first seal portion 12. An annular channel 22 is formed in a radial inner portion 24 of the second seal portion 14. The annular channel 22 is adapted to receive the outer free edge 20 of the first seal portion 12. The second seal portion 14 is fastened to the first seal portion 12 by any conventional fastening means such as vulcanizing, heat welding, press fitting, an adhesive, or a mechanical means of attachment, for example. A radial outer portion 26 extends radially outwardly from the radial inner portion 24. In the embodiment shown, the second seal portion 14 is produced from an elastomer. It is understood that the second seal portion 14 may be produced from any conventional material such as an ethylene propylene diene monomer (EPDM), fluorocarbon rubber (FKM), chloroprene rubber (CR), acrylonitrile butadiene rubber (NBR), and hydrogenated acrylonitrile butadiene rubber (HNBR), for example.

Figure 3A:
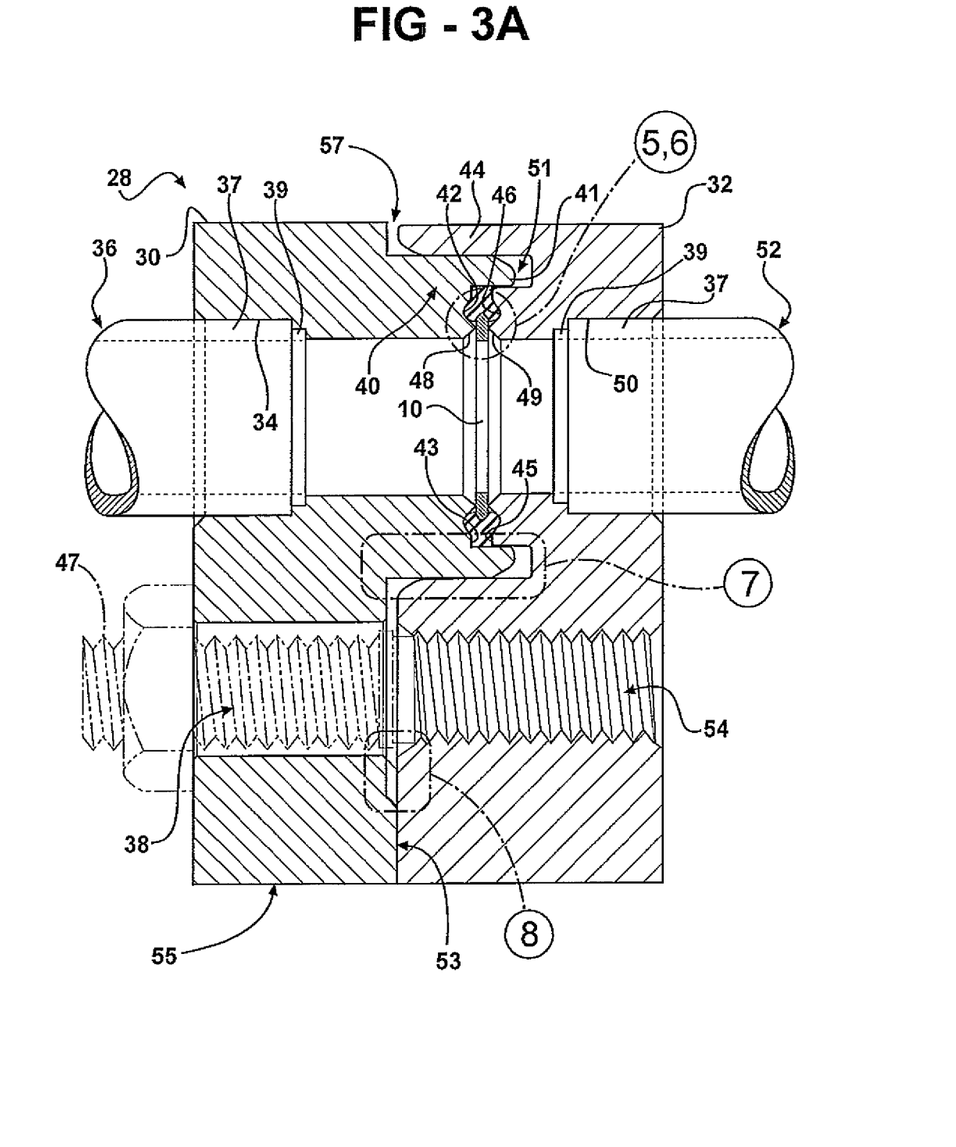
FIG. 3A is a cross-sectional view of a fitting including the seal structure illustrated in FIGS. 1 and 2, the fitting including a male block portion and a female block portion having the seal structure disposed therebetween and sealingly engaged with a threaded stud fastener.

In FIG. 3A, the seal structure 10 is shown disposed in a block fitting 28. The block fitting 28 includes a male block portion 30 and a female block portion 32. Although shown as independent components, one of ordinary skill in the art should understand that each of the male block portion 30 and the female block portion 32 may be integrated into other components such as a compressor housing and a condenser manifold, as nonlimiting examples, within the scope of the present disclosure.

The male block portion 30 includes a first aperture 34 having a generally circular cross-section, and is adapted to receive a tube or conduit 36. It is desirable, although not critical, to have a clearance fit between the tube 36 and the bore 37 for brazing. The tube 36 can be further joined to the male block portion 30 by any conventional method such as by brazing or welding, for example. It is understood that the male block portion 30 may form a trap 39 for a brazing material (not shown) to militate against the migration of the brazing material towards the annular surface 43. The male block portion 30 includes a second aperture 38 adapted to receive a fastener 47.

An annular shoulder 40 is formed on a second end of the male block portion 30 and includes an axially extending lip 41 formed at a first end thereof. The lip 41 surrounds an annular surface 43. An annular channel 42 is formed in the annular surface 43. It is understood that a protuberance (not shown) can be formed on the annular surface 43 in place of or in addition to the channel 42. In the embodiment shown, the channel 42 is substantially V-shaped in cross-section. However, it is understood that channels 42 having other shapes can be used as desired.

A sealing bead 48 is formed on the annular surface 43 of the male block portion 30 radially inward of the channel 42. Although the sealing bead 48 shown has a V-shaped cross-section, other shapes can be used such as a curved radius, a rectangular, or other shape, for example. In particularly illustrative embodiments, the sealing bead 48 either has a tip that is substantially V-shaped with a sharp angle (shown in FIG. 5) or is rounded with a radius R (shown in FIG. 6). Even where the tip is rounded, however, the sealing bead 48 is sufficiently sharp so as to cut through a contamination such as oil, dirt, hair, paint flakes, and other debris that may undesirably be present at the first seal portion 12 of the seal structure 10. As a nonlimiting example, a maximum radius R of the rounded sealing bead 48 sufficient to cut through the contamination and impinge the first seal portion 12 may be up to about 0.1 mm. Other radii R for the rounded sealing bead 48 sufficient to cut through the contamination and impinge the first seal portion 12 may also be employed. Only one sealing bead 48 is shown, however, a plurality of sealing beads 48 can be used if desired, resulting in concentric rings.

The female block portion 32 includes a first aperture 50 having a generally circular cross-section, and is adapted to receive a tube or conduit 52. The tube 52 is joined to the female block portion 32 by any conventional method such as by brazing or welding, for example. It is understood that the female block portion 32 may also form the trap 39 for a brazing material (not shown) to militate against the migration of the brazing material towards the annular surface 45. The female block portion 32 includes a second aperture 54 formed therein adapted to receive the fastener 47.

Figure 3B:
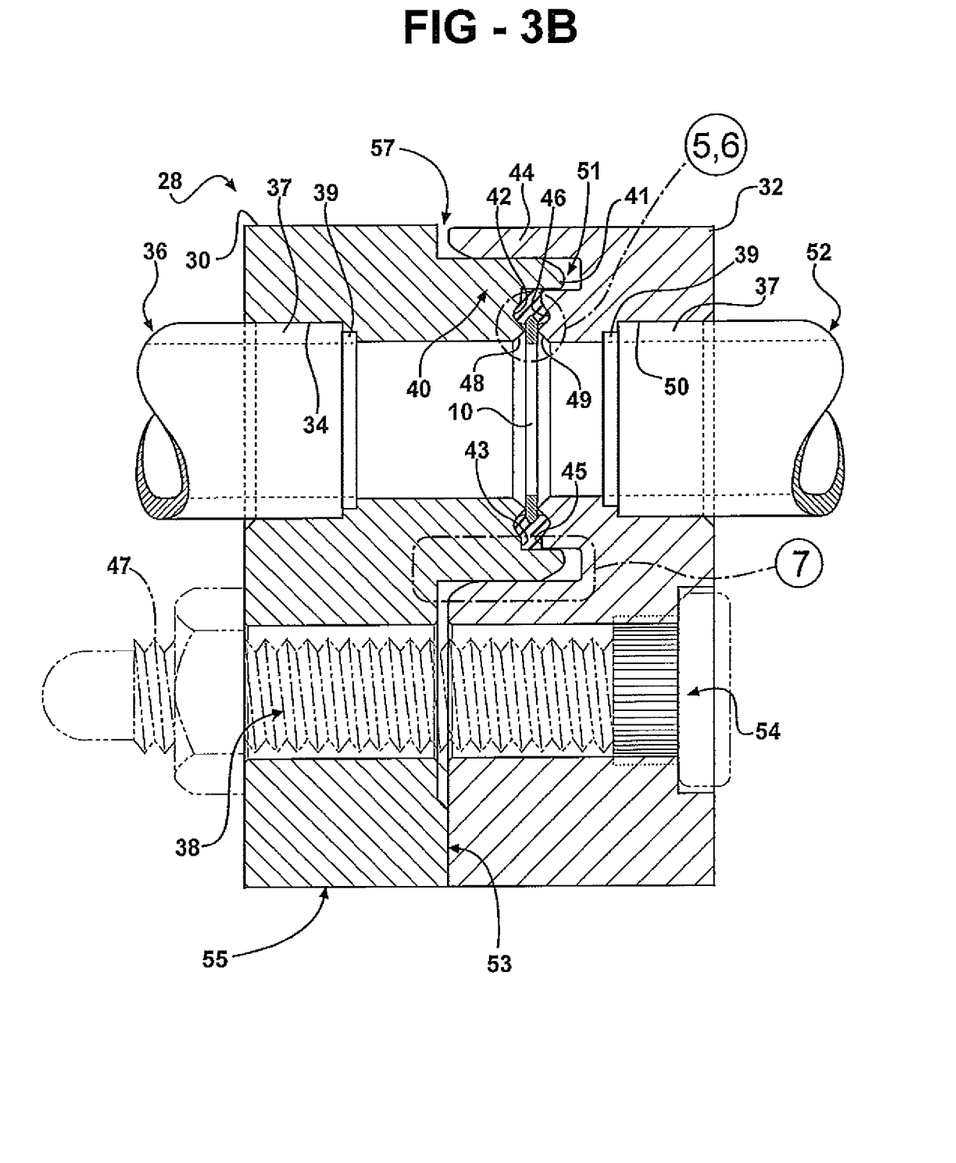
FIG. 3B is a cross-sectional view of a fitting including the seal structure illustrated in FIGS. 1 and 2, the fitting including a male block portion and a female block portion having the seal structure disposed therebetween and sealingly engaged with a threaded stud fastener having a knurled head.

At least one of the second aperture 38 of the male block portion 30 and the second aperture of the female block portion 32 may be threaded for cooperation with a threaded fastener 47 such as a bolt. In the embodiment shown in FIG. 3A, the second aperture 54 of the female block portion 32 is threaded and cooperates with the fastener 47 in the form of a threaded stud. As shown in FIG. 3B, the fastener 47 may be in the form of a threaded stud having a knurled head that is disposed through the second aperture 54 of the female block portion 32. In both examples, the threaded stud is also disposed through the second aperture 38 of the male block portion 30. The fastener 47 further includes a nut that cooperates with the threaded stud adjacent the male block portion 30, and thereby sealingly engages the male block portion 30 with the female block portion 32. A skilled artisan should understand that other suitable types of fasteners 47 may also be used within the scope of the present disclosure.

An annular collar 44 is formed on a second end of the female block portion 32 and surrounds the first aperture 50. An annular surface 45 is formed between the annular collar 44 and the first aperture 50. The annular surface 45 includes an annular channel 46 formed therein. It is understood that a protuberance (not shown) can be formed on the annular surface 45 in place of the channel 46 or in addition to the channel 46. It is understood that channels 46 having cross-sectional shapes other than that shown can be used. The female block portion 32 also has an annular groove 51 between the first aperture 50 and the annular collar 44. The annular groove 51 cooperates with the axially extending lip 41 of the male block portion 30 when the male block portion 30 and the female block portion 32 are assembled to form the block fitting 28.

The female block portion 32 includes a sealing bead 49 formed on the annular surface 45 radially inward of the channel 46, and opposing the sealing bead 48 of the male block portion 30. It should be appreciated that the opposing sealing beads 48, 49 facilitate the formation of the primary seal regardless of the presence of conventional contamination at the first seal portion 12 of the seal structure 10. Like the sealing bead 48 of the male block portion 30, the sealing bead 49 of the female block portion 32 may have a tip that is substantially V-shaped with a sharp angle (shown in FIG. 5), or that is rounded with the radius R (shown in FIG. 6). The sealing bead 49 is also sufficiently sharp so as to cut through a contamination such as oil, dirt, hair, and other debris that may undesirably be present at the first seal portion 12 of the seal structure 10. The sealing bead 49 may have any other suitable cross-sectional shape, as desired. A plurality of sealing beads 49 can also be used if desired, resulting in concentric rings.

The male block portion 30 and the female block portion 32 may be formed from any material providing sufficient corrosion resistance under air conditioning system operating conditions. For example, the male block portion 30 and the female block portion 32 may be formed by either extruding or die casting a metal such as aluminum or steel, or a metal alloy such as an aluminum alloy. In a particular example, the male block portion 30 and the female block portion 32 are die cast from an aluminum alloy suitable for die casting. An exemplary aluminum alloy for die casting has up to about 0.6 percent copper, in order to provide the desired corrosion resistance. In a further example, the male block portion 30 and the female block portion 32 are anodized to minimize corrosion during operation of the block fitting 28. Other suitable materials and treatments for enhancing corrosion resistance may be employed, as desired.

To assemble the block fitting 28 illustrated in FIGS. 3A and 3B, the tube 36 is inserted in the first aperture 34 of the male block portion 30 and secured. The tube 52 is inserted in the first aperture 50 of the female block portion 32 and secured. The seal structure 10 is disposed within the annular lip 41 such that a portion of the second seal portion 14 is disposed on the annular surface 43 of the male block portion 30 and a remainder of the second seal portion 14 is disposed in the channel 42. The seal structure 10 abuts the annular surface 45 of the female block portion 32 such that a portion of the second seal portion 14 is disposed on the annular surface 45 and a remainder of the second seal portion 14 is disposed in the channels 46. The sealing beads 48, 49 abut the first seal portion 12 of the seal structure 10. The male block portion 30 and the female block portion 32 are moved adjacent one another. The fastener 47 is inserted through the second apertures 38, 54 and tightened to sealingly engage the male block portion 30 and the female block portion 32. The sealing beads 48, 49 impinge the first seal portion 12 of the seal structure 10 to form the primary seal. The second seal portion 14 of the seal structure 10 creates a secondary seal with the annular surfaces 43, 45.

Once assembled, the male block portion 30 and the female block portion 32 cooperate with the seal structure 10 to form a fluid tight seal, and militate against leakage of a fluid (liquid or gas) from the tubes 36, 52. If an amount of the fluid flowing through the tubes 36, 52 leaks past the primary seal formed by the first seal portion 12 and the sealing beads 48, 49, the second seal portion 14 militates against the leakage of the fluid from the block fitting 28 to the atmosphere. The second seal portion 14 also serves as an environmental seal keeping harmful contaminants away from the first seal portion 12. The second seal portion 14 is also a retainer to keep the seal structure 10 in the male block portion 30 during shipping and handling prior to assembly of the block fitting 28.

Figure 4:
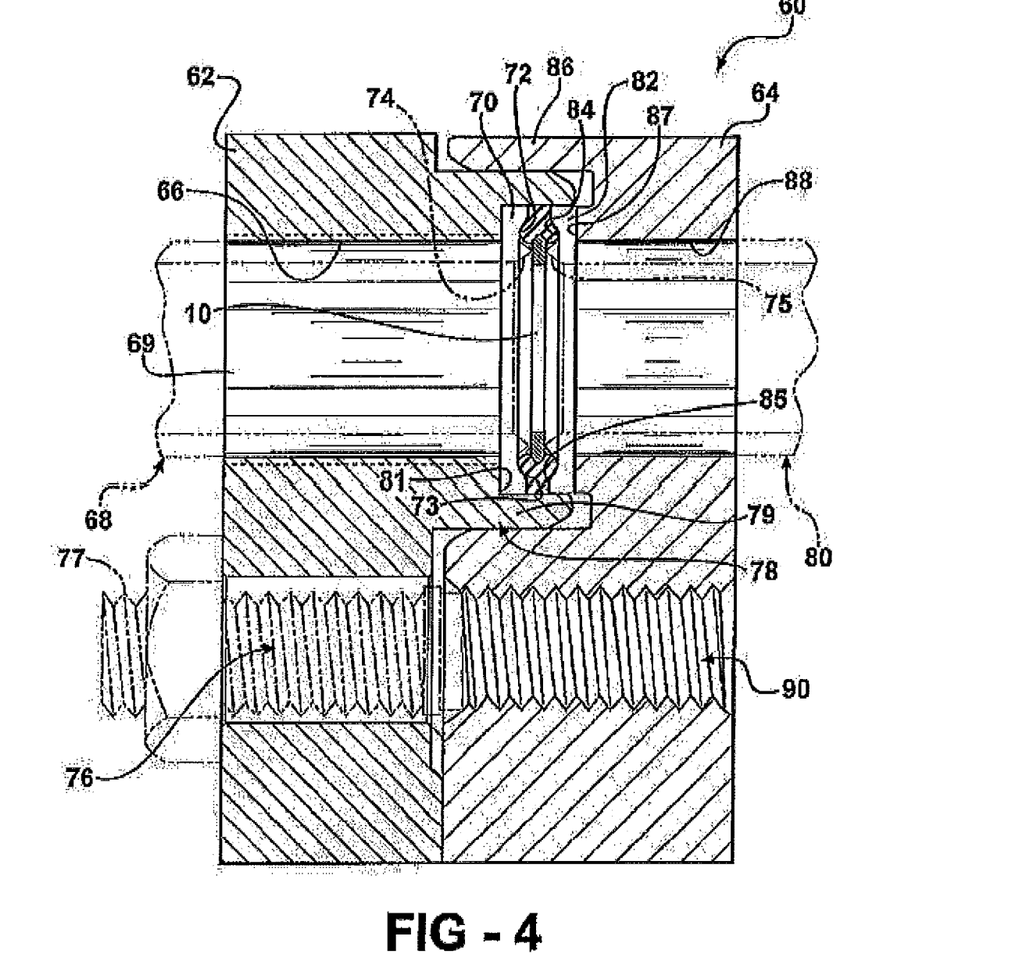
FIG. 4 is a cross-sectional view of a fitting according to another embodiment of the invention including the seal structure illustrated in FIGS. 1 and 2.

FIG. 4 shows a block fitting 60 for use with the seal structure 10 according to another embodiment of the invention. Suitable materials, dimensions, manufacturing methods, and assembly methods described hereinabove with respect to the block fitting 28 are also suitable for the block fitting 60 of the present disclosure.

Figure 10:
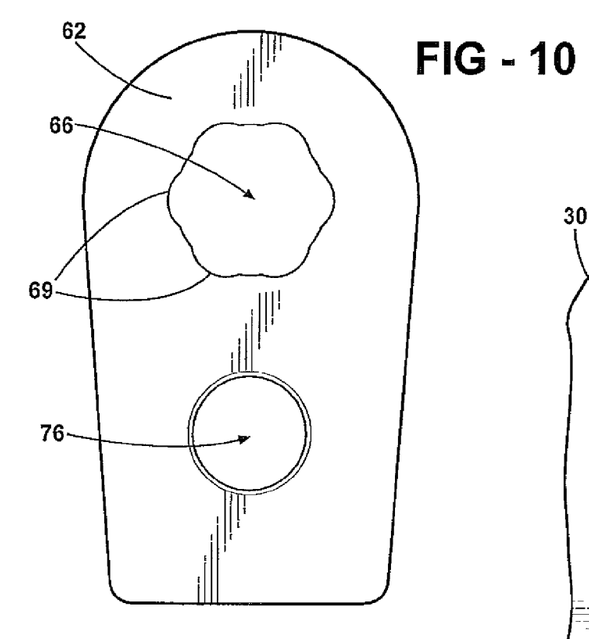
FIG. 10 is a rear elevational view of a male block portion illustrated in FIG. 4, showing a plurality of rounded splines in a first aperture of the male block portion.

The block fitting 60 includes a male block portion 62 and a female block portion 64. The male block portion 62 includes a first aperture 66 having a generally circular cross-section, and is adapted to receive a tube or conduit 68. It is desirable, although not critical, to have a press fit between the tube 68 and the wall forming the first aperture 66. Splines 69 formed on the wall forming the first aperture 66 can also be used to accomplish the desired interference fit. As shown in FIG. 10, the splines 69 may be rounded in order to achieve a desired gripping of the tube 68 without splitting the male block portion 62 during expansion of the tube 68 in operation. As a nonlimiting example, the splines 69 may have a radius of up to about 3.0 mm, although other suitable radii may also be used. The tube 68 can be further joined to the male block portion 62 by any conventional method such as by brazing or welding, for example. The male block portion 62 includes a second aperture 76 formed therein adapted to receive a fastener 77.

An annular shoulder 78 is formed on the male block portion 62, and includes an axially extending lip 79 formed at a first end thereof. The lip 79 surrounds an annular surface 81. The annular surface 81 is adapted to receive a first end 70 of the tube 68. An annular channel 72 is formed in the first end 70. It is understood that a protuberance (not shown) can be formed on the first end 70 in place of or in addition to the channel 72. In the embodiment shown, the channel 72 is substantially V-shaped in cross-section. However, it is understood that the channel 72 having other shapes can be used as desired.

A sealing bead 74 is formed on the first end 70 of the tube 68 radially inward of the channel 72. For example, the sealing bead 74 is formed on a flanged or flared portion of the first end 70 of the tube 68 and caused to impinge the seal structure 10 by movement of the male block portion 62 toward the female block portion 64. In particularly illustrative embodiments, the sealing bead 74 either has a tip that is substantially V-shaped with a sharp angle (shown in FIG. 5) or is rounded with a radius R (shown in FIG. 6). Even where the tip is rounded, however, the sealing bead 74 is sufficiently sharp so as to cut through a contamination such as oil, dirt, hair, paint flakes, and other debris that may undesirably be present at the first seal portion 12 of the seal structure 10. As a nonlimiting example, a maximum radius R of the rounded sealing bead 74 sufficient to cut through the contamination and impinge the first seal portion 12 may be up to about 0.1 mm, Other radii R for the rounded sealing bead 74 sufficient to cut through the contamination and impinge the first seal portion 12 may also be employed. Although the sealing bead 74 shown has a V-shaped cross-section, other shapes can be used such as a curved radius, a rectangular, or other shape for example. A plurality of sealing beads 74 can also be used if desired, resulting in concentric rings.

The female block portion 64 includes a first aperture 88 having a generally circular cross-section. In the embodiment shown, the first aperture 88 is adapted to receive a tube or conduit 80. It is desirable, although not critical, to have a press fit between the tube 80 and the wall forming the first aperture 88. Splines 69 formed on the wall forming the first aperture 88 can also be used to accomplish the desired interference fit. Like the splines 69 formed in the first aperture 66 of the male block portion 62, the splines 69 of the female block portion 64 may be rounded to militate against a splitting of the female block portion 64 with expansion of the tube 80 in operation. Also, the tube 80 may be joined to the female block portion 64 by any conventional method such as by brazing or welding, for example.

The female block portion 64 includes a second aperture 90 adapted to receive the fastener 77. An annular collar 86 is formed on a second end of the female block portion 64 to surround the first aperture 88, and includes an annular surface 87. The annular surface 87 is adapted to receive the first end 82 of the tube 80. An annular channel 84 is formed in the first end 82. It is understood that a protuberance (not shown) can be formed on the first end 82 in place of or in addition to the channel 84. In the embodiment shown, the channel 84 is substantially V-shaped in cross-section. However, it is understood that channels 84 having other shapes can be used as desired.

A sealing bead 75 is formed on the first end 82 of the tube 80 radially inward of the channel 84. Like the sealing bead 74 of the male block portion 62, the sealing bead 75 adjacent the channel 84 may have a tip that is substantially V-shaped with a sharp angle (shown in FIG. 5), or that is rounded with the radius R (shown in FIG. 6). The sealing bead 75 is also sufficiently sharp so as to cut through a contamination such as oil, dirt, hair, and other debris that may undesirably be present at the first seal portion 12 of the seal structure 10. The sealing bead 75 may have any other suitable cross-sectional shape, as desired. A plurality of sealing beads 75 can also be used if desired, resulting in concentric rings.

To assemble the embodiment of the invention illustrated in FIG. 4, the tube 68 is inserted in the first aperture 66 of the male block portion 62 with the first end 70 disposed adjacent and radially inward of the annular shoulder 78. The tube 80 is inserted in the first aperture 88 of the female block portion 64 with the first end 82 disposed adjacent and radially inward of the annular collar 86. The seal structure 10 is disposed between the first end 70 of the tube 68 and the first end 82 of the tube 80. A portion of the second seal portion 14 is received on a surface 73 of the tube 68. A remainder of the second seal portion 14 is received on a surface 85 of the tube 80. The sealing beads 74, 75 abut the first seal portion 12 of the seal structure 10. The male block portion 62 and the female block portion 64 are moved adjacent one another. The fastener 77 is inserted through the second apertures 76, 90 and tightened to sealingly engage the male block portion 62 and the female block portion 64. The sealing beads 74, 75 plastically deform the first seal portion 12 of the seal structure 10 to form a primary seal. The second seal portion 14 of the seal structure 10 forms a secondary seal with the surfaces 73, 85.

Once assembled, the first end 70 of the tube 68 and the first end 82 of the tube 80 cooperate with the seal structure 10 to form a fluid tight seal, and militate against leakage of a fluid (liquid or gas) from the tubes 68, 80. If an amount of the fluid flowing through the tubes 68, 80 leaks past the primary seal formed by the first seal portion 12 and the sealing beads 74, 75, the second seal portion 14 militates against leakage of the fluid from the tubes 68, 80 to the atmosphere. The second seal portion 14 also serves as an environmental seal keeping harmful contaminants away from the first seal portion 12. The second seal portion 14 is also a retainer to keep the seal structure 10 in the male block portion 62 during shipping and handling prior to assembly of the block fitting 60.

The present disclosure includes further constraints that are configured to optimize a performance of the block fitting 28, 60 shown in FIGS. 3 and 4, and minimize a leaking of a refrigerant from the air conditioning system using the block fitting 28, 60. Exemplary constraints are hereinafter described in relation to the block fitting 28 shown in FIGS. 3A and 3B. However, it should be understood that the exemplary constraints are equally applicable to the further embodiment of the block fitting 60 shown in FIG. 4.

Figure 5:
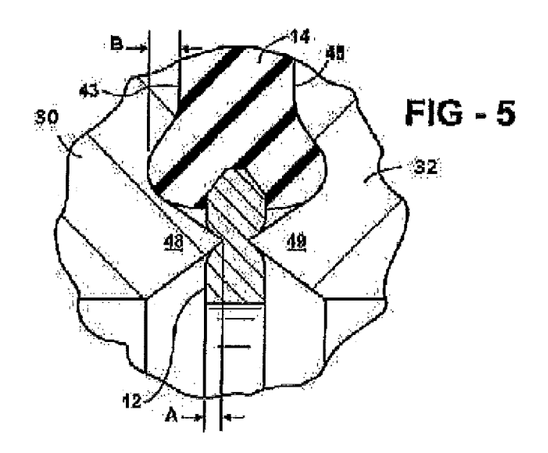
FIG. 5 is an enlarged, fragmentary cross-sectional view of the fitting including the seal structure illustrated in FIG. 3A, showing sealing beads impinging on the first seal portion, each of the sealing beads being substantially V-shaped in cross-section.
Figure 6:
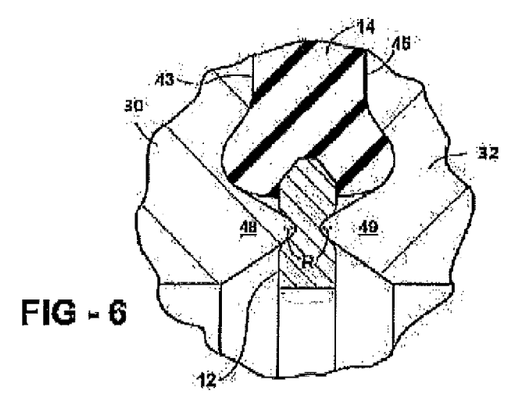
FIG. 6 is an enlarged, fragmentary cross-sectional view of the fitting including the seal structure illustrated in FIG. 3A, showing sealing beads impinging on the first seal portion, each of the sealing beads having a rounded tip.

As shown in FIGS. 5 and 6, the seal structure 10 when installed in the block fitting 28, and compressed under a torque of the fastener 47, provides the primary and secondary seals of the block fitting 28. The sealing beads 48, 49 impinge each of the opposing first and second surfaces 16, 18 of the first seal portion 12 to a depth A of up to about thirty percent (30%) of a maximum thickness of the first seal portion 12. In a particularly illustrative embodiment, the depth A is from about ten percent (10%) to about thirty percent (30%) of the maximum thickness. For example, where the maximum thickness of the first seal portion 12 is about 1.0 mm, the sealing beads 48 may each impinge the first seal portion 12 from about 0.1 mm to about 0.3 mm. It has surprisingly been found that the impinging of the first seal portion 12 to the depth A permits the formation of the primary seal while also allowing the sealing beads 48, 49 to cut through any contamination on the seal structure 10. The opportunity for a leakage path to form through the primary seal is thereby minimized.

As further shown in FIGS. 5 and 6, the second seal portion 14 is compressed to a depth B of up to about thirty-five percent (35%) of a maximum thickness of the second seal portion 14. In a particular embodiment, the second seal portion 14 is compressed to the depth B of from about twenty-five percent (25%) to about thirty-five percent (35%) when the seal structure 10 is installed in the block fitting 28. A skilled artisan should understand that the depth B may be controlled by modifying a height of the sealing beads 48, 49 relative to the adjacent annular surface 43, 45 of the male block portion 30 and the female block portion 32. It has been found that only compressing the second seal portion 14 to the extent defined by the depth B militates against an over-compression and tearing of the second seal portion 14. An integrity of the second seal portion 14 is thereby maintained during operation of the block fitting 28.

Figure 7:
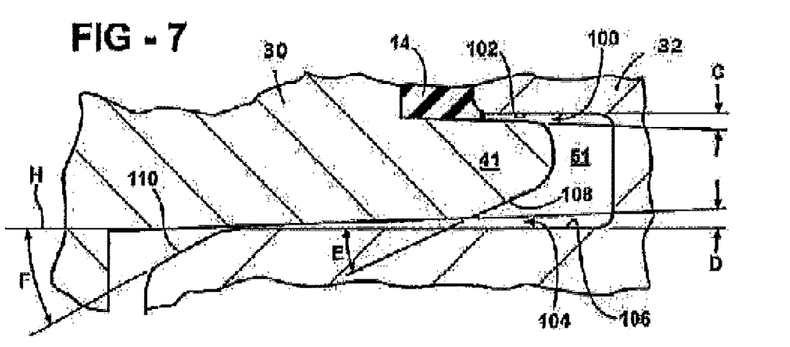
FIG. 7 is an enlarged, fragmentary cross-sectional view of the fitting including the seal structure illustrated in FIG. 3A, showing the dual tapered axially extending lip of the male block portion cooperating with an annular groove of the female block portion.

With references to FIG. 7, the blocking fitting 28 of the present disclosure may include a fine pilot that is formed by a fine gap 100 between the axially extending lip 41 and a first surface 102 of the annular groove 51. A coarse pilot may also be formed by a coarse gap 104 between the axially extending lip 41 and a second surface 106 of the annular groove 51 disposed opposite the first surface 102 of the annular groove 51. The coarse and fine pilots militate against a binding during assembly of the male block portion 30 with the female block portion 32. The fine pilot also facilitates a proper sealing of the female block portion 32 with the seal structure 10. It is particularly advantageous that an average width of the fine gap 100 forming the fine pilot is less than an average width of the coarse gap 104 forming the coarse pilot. The fine gap 100 forming the fine pilot thereby militates against an extrusion of the second seal portion 14 therethrough, for example, during the engagement of the male block portion 30 with the female block portion 32 and the resulting compression of the second seal portion 14.

The axially extending lip 41 may also be dual tapered to militate against the binding of the male block portion 30 and the female block portion 32 during the assembly of the block fitting 28. For example, as shown in FIG. 7, the axially extending lip 41 may have an inner draft angle C and an outer draft angle D that provides the dual tapering of the axially extending lip 41. The inner and outer draft angles C, D may be the same or different, as desired. In a particular embodiment, each of the inner and outer draft angles C, D is no greater than about 1.5 degrees relative to a horizontal plane H defined by or parallel with the surface 106 of the annular groove 51. The draft angles C, D of 1.5 degrees or less have been observed to facilitate a proper assembly and sealing of the male block portion 30 with the female block portion 32.

One of ordinary skill in the art should also understand that the first surface 102 and the second surface 106 may also be tapered to facilitate the proper assembly and sealing of the male block portion 30 with the female block portion 32, as desired.

The axially extending lip 41 may further have a first guiding surface 108 with an angle E in respect of the horizontal plane H for facilitating the piloting of the axially extending lip 41 into the annular groove 51. The first guiding surface 108 may cooperate with a second guiding surface 110 with an angle F in respect of the horizontal plane H formed on the annular collar 44 of the female block portion 32. The angles E, F may be substantially the same so as to facilitate the guided insertion of the axially extending lip 41 into the annular groove 51. In a particular embodiment, the angles E, F are between about eighteen degrees (18°) and about twenty-two degrees (22°) relative to the horizontal plane H defined by or parallel with the surface 106 of the annular groove 51. In a particularly illustrative example, the angles of E, F are about twenty degrees (20°) over about a 2.0 mm span. Other angles E, F for the first and second guiding surfaces 108, 110 may also be employed, as desired.

Figure 8:
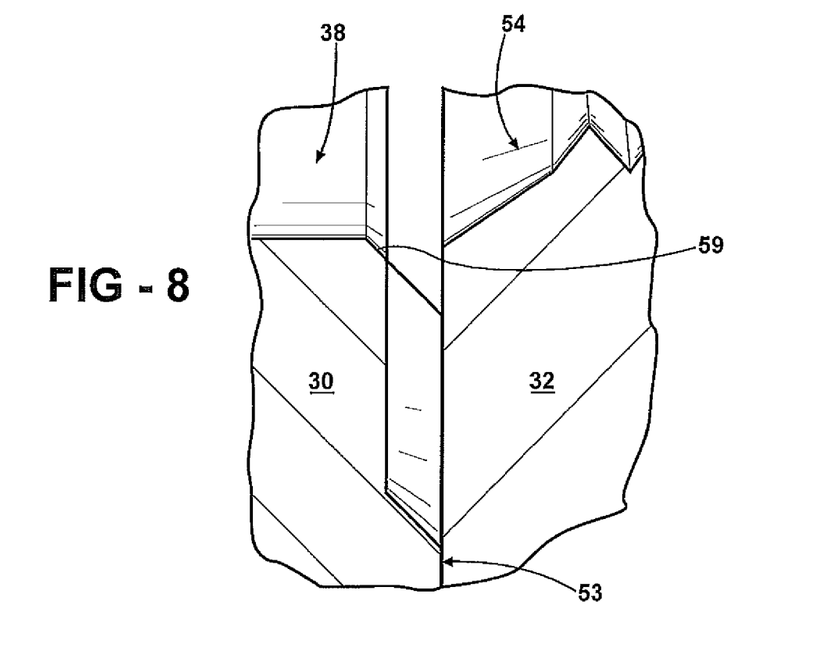
FIG. 8 is an enlarged, fragmentary cross-sectional view of the fitting including the seal structure illustrated in FIG. 3A, showing a heel formed adjacent a base of the male block portion.

As shown in FIG. 8, the second aperture 38 of the male block portion 30 may further have a chamfered edge break 59. The chamfered edge break 59 may be located at both ends of the second aperture 38, for example, on both the first and second sides of the male block portion 30. The chamfered edge break 59 facilitates the insertion of the fastener 47 into the second aperture 38, and minimizes the opportunity for the undesirable binding of the fastener 47 with the male block portion 30. The chamfered edge break 59 also militates against the fastener 47 from reaching too severe of an angle for assembly. In a particular embodiment, the chambered edge break 59 has a length of about 0.4 mm. A skilled artisan should appreciate that other dimensions for the chambered edge break 59 may also used within the scope of the present disclosure.

With renewed reference to FIGS. 3A and 3B, the male block portion 30 of the block fitting 28 has an outwardly projecting heel 53. The heel 53 is disposed between a base 55 of the male block portion 30 and the second aperture 38 of the male block portion 30. A skilled artisan should appreciate that the outwardly projecting heel 53 may alternatively be formed on the female block portion 32 between a base of the female block portion 32 and the second aperture 54 of the female block portion, as desired.

Figure 9:
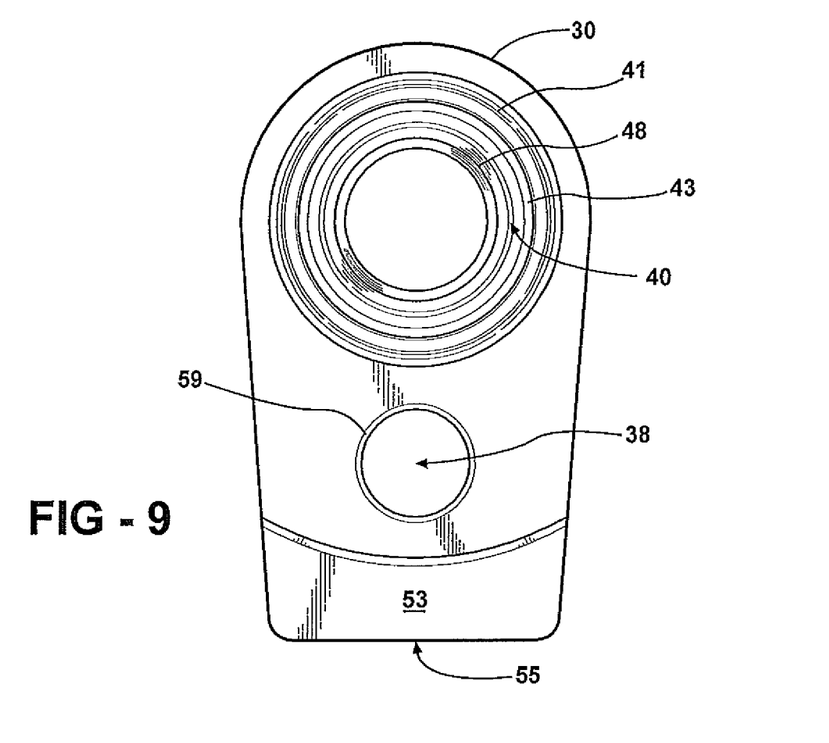
FIG. 9 is a front elevational view of the male block portion illustrated in FIG. 3A, showing a surface area of the heel formed adjacent the base of the male block portion.

As illustrated in FIG. 9, a surface area of the heel 53 is sufficient to militate against a substantial plastic deformation or collapse of the heel 53 when the male block portion 30 is pressed together with the female block portion 32 under pressure from the fastener 47 when torqued. In one embodiment, the heel 53 has an arcuate upper surface that increases the surface area of the heel and further militates against a collapse thereof with torque pressure from the fastener 47.

Figure 11:
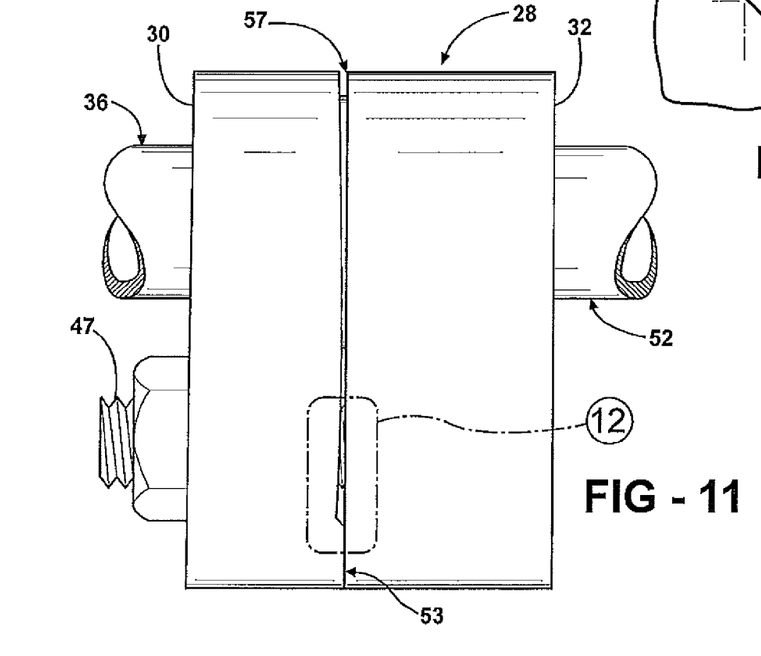
FIG. 11 is a side elevational view of the fitting illustrated in FIG. 3A, the male block portion acting as a spring above the heel when fastened to the female block portion with the fastener.
Figure 12:
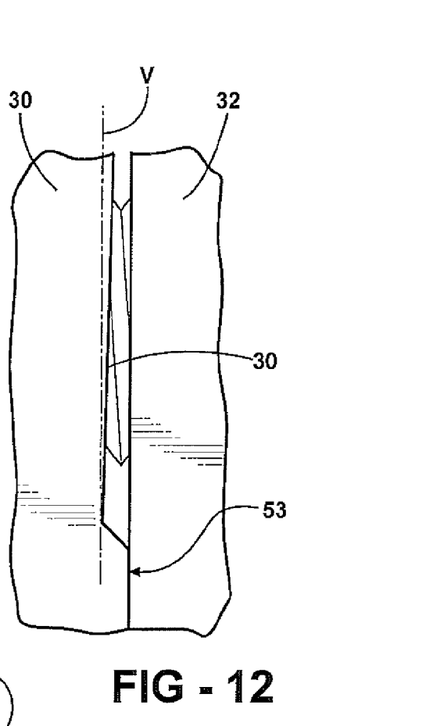
FIG. 12 is an enlarged, fragmentary side elevational view of the fitting illustrated in FIG. 11, further showing a spring-like bending of the male block portion due to a force applied by the fastener.

With reference to FIG. 11, where the male block portion 30 and the female block portion 32 are fully engaged by the fastener 47, a gap 57 advantageously remains between the annular collar 44 of the female block portion 32 and the male block portion 30. In combination with the heel 53 disposed adjacent the base 55 of the male block portion 30, and the gap 57 remaining between the annular collar 44 and the male block portion 30, the male block portion 30 may be appropriately dimensioned and formed from an elastic material such as steel, aluminum, or an aluminum alloy. For example, as illustrated in FIGS. 11 and 12, the male block portion 30 may be biased or leveraged inwardly from a vertical plane V by the fastener 47, with a lower portion of the male block portion 30 constrained by the heel 53 and remaining unbiased. Due to the elasticity of the material forming the male block portion 30, a spring action of the male block portion 30 arises under these conditions.

A substantially constant sealing pressure may be provided on the seal structure 10 by the spring action of the male block portion 30 when assembled in the block fitting 28. The sealing pressure is also substantially centered at the sealing structure 10 when the male block portion 30 is engaged with the female block portion 32 via the fastener 47. The spring action of the male block portion 30 may also accommodate thermal expansion differentials between the male block portion 30 and the female block portion 32 during operation of the block fitting 28. One of ordinary skill in the art should also understand that the utilization of the spring action of the male block portion 30 allows one to avoid employment of a spring washer with the fastener 47, as is used in certain state-of-the-art block fitting designs.

The block fitting 28, 60 manufactured according to the constraints of the present disclosure thereby minimizes a leaking of the refrigerant from the air conditioning system including the same.

While certain representative embodiments and details have been shown for purposes of illustrating the invention, it will be apparent to those skilled in the art that various changes may be made without departing from the scope of the disclosure, which is further described in the following appended claims.

What is claimed is:

1. A block fitting for an air conditioning system comprising:
    a male block portion including a first aperture receiving a tube end therein, the male block portion including an annular shoulder surrounding the first aperture of the male block portion, the annular shoulder including an axially extending lip formed at a first end thereof, the axially extending lip having an inner circumferential surface and an outer circumferential surface;
    a female block portion including a first aperture receiving a tube end therein, the female block portion including an annular collar surrounding the first aperture of the female block portion and cooperating with the annular shoulder formed by the male block portion, the first aperture of the male block portion and the first aperture of the female block portion being substantially concentrically aligned, the female block portion having an annular groove between the aperture and the annular collar, the annular groove having an inner circumferential surface and an outer circumferential surface, the annular groove cooperating with the axially extending lip of the male block portion, the outer circumferential surface of the annular groove disposed opposite the inner circumferential surface of the annular groove;
    a seal structure disposed radially inward from the axially extending lip of the male block portion and between the male block portion and the female block portion, the seal structure including a first seal portion produced from a plastically deformable metal or plastic material and having a free edge, the first seal portion surrounding the first aperture of the male block portion and the first aperture of the female block portion, and a second seal portion produced from an elastomer disposed on the free edge of the first seal portion; and
    a fastener engaging the male block portion and the female block portion, the fastener causing the male block portion and the female block portion to deform the first seal portion and provide a primary seal between the male block portion and the female block portion, and the fastener causing the male block portion and the female block portion to cooperate with the second seal portion and provide a secondary seal between the male block portion and the female block portion, wherein the primary seal and the secondary seal militate against a leakage of a fluid from the block fitting,
    wherein when the tube ends are received in the first and second apertures, the male and female block portions have opposing sealing beads that plastically deform the first seal portion and provide the primary seal between the male block portion and the female block portion, wherein a fine pilot is formed by a fine gap between the inner circumferential surface of the axially extending lip and the inner circumferential surface of the annular groove and a coarse pilot is formed by a coarse gap between the outer circumferential surface of the axially extending lip and the outer circumferential surface of the annular groove, wherein an average width of the fine gap forming the fine pilot is less than an average width of the coarse gap forming the coarse pilot, and wherein the inner circumferential surface of the axially extending lip and the outer circumferential surface of the axially extending lip are tapered in a manner wherein the axially extending lip is dual tapered along a length thereof from a base of the axially extending lip to a distal end thereof to militate against a binding of the mate block portion and the female block portion during assembly of the block fitting.

2. The block fitting of claim 1, wherein each of the sealing beads is substantially V-shaped in cross-section.

3. The block fitting of claim 2, wherein each of the sealing beads has a tip that is rounded but sufficiently sharp to cut through a contamination at the first seal portion.

4. The block fitting of claim 1, wherein the first seal portion has a hardness of less than about 40 HR 15T.

5. The block fitting of claim 1, wherein each of the sealing beads impinges opposing first and second surfaces of the first seal portion to a depth of up to about thirty percent (30%) of a maximum thickness of the first seal portion.

6. The block fitting of claim 5, wherein the second seal portion is compressed up to about thirty-five percent (35%) of a maximum thickness of the second seal portion by the male block portion and the female block portion.

7. The block fitting of claim 1, wherein the width of the fine gap forming the fine pilot militates against an extrusion of the second seal portion therethrough during the engagement of the male block portion with the female block portion.

8. The block fitting of claim 1, wherein the male block portion includes a second aperture and the female block portion includes a second aperture, the second aperture of the female block portion having an internal thread, the second aperture of the female block portion receiving the fastener.

9. The block fitting of claim 8, wherein the fastener is a threaded stud, the threaded stud disposed through the second aperture of the male block portion and cooperating with the internally threaded second aperture of the female block portion, a nut cooperating with the threaded stud adjacent the male block portion to sealingly engaging the male block portion and the female block portion.

10. The block fitting of claim 8, wherein the male block portion includes an outwardly projecting heel disposed adjacent the second aperture, a surface area of the heel sufficient to militate against a substantial plastic deformation of the heel during the engagement of the male block portion and the female block portion.

11. The block fitting of claim 10, wherein a lip of the second aperture of the male block portion has a chamfered edge break that militates against a binding of the fastener with the male block portion and the female block portion during the engagement thereof.

12. The block fitting of claim 10, wherein the male block portion adjacent the heel is dimensioned and formed from a material that facilitates a spring action of the male block portion when the male block portion is engaged to the female block portion with the fastener, the spring action accommodating thermal expansion differentials between the male block portion, the female block portion, and the fastener during operation of the block fitting, the male block portion imparting a sealing pressure substantially centered at the sealing structure.

13. The block fitting of claim 1, wherein a surface forming the first aperture of at least one of the male block portion and the female block portion includes a plurality of rounded splines providing an interference fit with the tube ends.

14. The block fitting of claim 1, wherein at least one of the male block fitting and the female block fitting is die cast from an aluminum alloy having a copper content of no greater than about 0.6 percent by weight.

15. The block fitting of claim 1, wherein the axially extending lip transitions from a linear tapering adjacent the base of the axially extending lip to a non-linear tapering adjacent the distal end of the axially extending lip on each of the inner circumferential surface of the axially extending lip and the outer circumferential surface of the axially extending lip.

16. The block fitting of claim 1, wherein the inner circumferential surface of the axially extending lip includes a first portion and a second portion, the first portion extending linearly and the second portion extending non-linearly.

17. The block fitting of claim 16, wherein the outer circumferential surface of the axially extending lip includes a first portion and a second portion, the first portion extending linearly and the second portion extending non-linearly.

\* \* \* \* \*